(12) United States Patent
Ludwig et al.

(10) Patent No.: US 8,645,967 B2
(45) Date of Patent: Feb. 4, 2014

(54) EFFICIENT SECURE DATA MARSHALING THROUGH AT LEAST ONE UNTRUSTED INTERMEDIATE PROCESS

(75) Inventors: Charles Alan Ludwig, Renton, WA (US); Joaquin Guanter Gonzalbez, Redmond, WA (US); Pritam De, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 13/221,290

(22) Filed: Aug. 30, 2011

(65) Prior Publication Data

US 2013/0054917 A1 Feb. 28, 2013

(51) Int. Cl.
*G06F 9/44* (2006.01)
*G06F 3/00* (2006.01)

(52) U.S. Cl.
USPC ........... 719/312; 718/104; 711/147; 711/163; 726/2; 713/164; 713/167

(58) Field of Classification Search
USPC ....... 719/312; 718/104; 711/147, 163; 726/2; 713/164, 167
See application file for complete search history.

(56) References Cited

U.S. PATENT DOCUMENTS

| | | | | |
|---|---|---|---|---|
| 5,881,286 A | * | 3/1999 | Kougiouris et al. | 719/312 |
| 6,067,559 A | * | 5/2000 | Allard et al. | 709/202 |
| 6,131,126 A | * | 10/2000 | Kougiouris et al. | 719/330 |
| 6,629,153 B1 | | 9/2003 | Gupta et al. | |
| 6,829,769 B2 | | 12/2004 | Cranston et al. | |
| 7,454,477 B2 | * | 11/2008 | Talluri et al. | 709/213 |
| 7,610,322 B2 | | 10/2009 | Grunkemeyer et al. | |
| 7,665,091 B2 | | 2/2010 | Venkatraman et al. | |
| 7,774,599 B2 | | 8/2010 | Guo et al. | |
| 8,180,905 B2 | * | 5/2012 | Schmieder et al. | 709/228 |
| 2008/0184255 A1 | * | 7/2008 | Watanabe et al. | 718/105 |
| 2008/0244507 A1 | * | 10/2008 | Hodson et al. | 717/106 |
| 2009/0205034 A1 | | 8/2009 | Williams et al. | |

OTHER PUBLICATIONS

Bononi, et al., "Analysis of High Performance Communication and Computation Solutions for Parallel and Distributed Simulation", Retrieved at <<http://citeseerx.ist.psu.edu/viewdoc/download?doi=10.1.1.157.1140&rep=rep1&type=pdf>>, International Conference on High Performance Computing and Communications, 2005, pp. 640-651.

Provos, et al., "Preventing Privilege Escalation", Retrieved at http://www.citi.umich.edu/u/provos/papers/privsep.pdf, Proceedings of the 12th conference on USENIX Security Symposium, vol. 12, 2002, pp. 11.

* cited by examiner

*Primary Examiner* — Hong Kim
(74) *Attorney, Agent, or Firm* — Brian Haslam; Mike Allen; Micky Minhas (57) ABSTRACT

Secure marshaling of data via one or more intermediate processes is provided. A source process may create a named shared memory section resulting in a first handle to the shared memory section. The source process may populate the shared memory section with information. An access control list may secure the shared memory section by preventing the one or more intermediate processes from accessing content of the shared memory section, while allowing a target process to access the content. The first handle and a name of the shared memory section may be marshaled to a first intermediate process resulting in a respective new handle to the shared memory section. A last intermediate process may marshal the name to a target process, which may use the name to obtain access to the content of the shared memory section.

20 Claims, 6 Drawing Sheets

EFFICIENT SECURE DATA MARSHALING THROUGH AT LEAST ONE UNTRUSTED INTERMEDIATE PROCESS

BACKGROUND

For a number of reasons, data is marshaled on a computing device from a source process to a target process. At times, the source process may marshal data to the target process through an intermediate process. When the intermediate process is not trusted, a mechanism for marshaling data between processes in an efficient and secure manner is desired. Ideally, the mechanism would use resources efficiently and prevent an untrusted intermediate process from accessing marshaled data.

One solution to this problem is the use of cryptography. Cryptography provides a mechanism for securely transmitting data along an untrusted channel. However, security of a cryptographic system depends entirely on keys. In some operating systems, including, but not limited to Windows® (Windows is a registered trademark of Microsoft Corporation of Redmond, Wash.) operating systems, an operating system provided key management system largely depends on an identity of a process. If trusted processes and untrusted processes execute under one user, then the trusted processes and the untrusted processes may have access to the same keys. As a result, in order to effectively use cryptography to secure data from the untrusted processes a secure key management system, separate from the key management system of the operating system, may be developed and employed.

Other solutions avoid marshaling data through an untrusted channel by either validating trust of an intermediate process, or by marshaling connection information, such that a direct channel may be established without passing data through an untrusted intermediate process.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, data may be securely and efficiently marshaled from a source process to a target process via one or more intermediate processes, which may be untrusted processes. In various embodiments, a source process may create a shared memory section having a name and a first handle that references the shared memory section for the source process. The source process may map the shared memory section to an address space of the source process, such that the source process may populate the shared memory section with information. The source process may secure the information in the shared memory section by using an access control list.

The source process may marshal the name of the shared memory section to the one or more intermediate processes and may marshal the first handle referencing the shared memory section to a first intermediate process of the one or more intermediate processes, resulting in a respective new handle that references the shared memory section for the first intermediate process. If there is more than one intermediate process, each intermediate process, except a last intermediate process, may marshal a respective handle to a next intermediate process resulting in a respective new handle for the next intermediate process. The access control list may prevent the one or more intermediate processes from using the respective new handle and the name of the shared memory section to gain access to the shared memory section.

The last intermediate process may marshal the name of the shared memory section and the respective new handle to a target process resulting in the target process having the name of the shared memory section and a third handle that references the shared memory section. The target process may use the name of the shared memory section to create a fourth handle that references the shared memory section for the target process and may provide the target process with access to the shared memory section. The target process may then map the shared memory section into an address space of the target process and may access the information stored in the shared memory section.

In variations of embodiments consistent with the subject matter of this disclosure, the source process, or sender, may store authentication data in the shared memory section and the target process may authenticate the source process, or the sender, based on the stored authentication data in the shared memory section. In addition, the source process may store a checksum or other information in the shared memory section such that the target process may detect whether contents of the shared memory section have been altered. In some variations, the source process may store a sequence number into the shared memory section and the target process may detect missing information or information arriving out of order based on detecting an unexpected gap in the sequence number stored in the shared memory section. In other variations, the source process may store a timestamp into the shared memory section and the target process may detect a replay attack based on reading an earlier timestamp than a timestamp stored in a previously read shared memory section. Other variations are also possible as will be discussed in the detailed description.

DRAWINGS

In order to describe the manner in which the above-recited and other advantages and features can be obtained, a more particular description is described below and will be rendered by reference to specific embodiments thereof which are illustrated in the appended drawings. Understand that these drawings depict only typical embodiments and are not therefore to be considered to be limiting of its scope. Implementations will be described and explained with additional specificity and detail through the use of the accompanying drawings.

DETAILED DESCRIPTION

Overview

Embodiments consistent with the subject matter of this disclosure efficiently and securely marshal data from a source process to a target process via one or more untrusted intermediate processes. The source process may call a function to create a named shared memory section and may return an open handle to the shared memory section.

The shared memory section is a type of kernel object. A kernel object is a resource that is managed by a kernel of an operating system. The kernel object may be memory, a file, computer hardware, or other resource and is secured or is a securable object. In embodiments consistent with the subject matter of this disclosure, the kernel object is represented by a handle. Operating systems, including, but not limited to, Windows® operating systems provide a set of functions for manipulating kernel objects. When a function is called to create a kernel object, the function may return a handle that identifies the kernel object.

The shared memory section may be secured by an access control list, which may be provided by a creator of the kernel object when the kernel object is created. The access control list prevents the one or more intermediate processes from accessing the shared memory section, but allows the target process to access the shared memory section. The source process may use the returned handle to call a function to map the shared memory section into an address space of the source process, such that the source process may populate the shared memory section with data to be read by the target process.

After populating the shared memory section with the data, the source process may marshal reference information to a first intermediate process of the one or more intermediate processes. The reference information may include, but not be limited to, the handle and a name of the shared memory section. As a result of marshaling the reference information, the first intermediate process of the one or more intermediate processes has an open respective new handle to the shared memory section and the name of the shared memory section. If there are two or more intermediate processes, each respective intermediate process, except a last intermediate process, may marshal the reference information to a next intermediate process resulting in an open respective new handle to the shared memory section for the next intermediate process.

In various embodiments, the shared memory section may be retained as long as an open handle to the shared memory section exists. Therefore, in such embodiments, after marshaling the handle to the first intermediate process of the one or more intermediate processes, the source process may close the handle and the shared memory section may be retained because of existence of the open respective new handle, which references the shared memory section. Similarly, after a respective intermediate process marshals the respective new handle to a next intermediate process, the intermediate process may close its respective new handle and the shared memory section may be retained because an open respective new handle to the shared memory section exists for the next intermediate process.

The last intermediate process may marshal the name and the respective new handle to the target process. After the marshaling of the name and the respective new handle, the last intermediate process may close its respective new handle. As a result of the marshaling, the target process has an open second handle to the shared memory section and the name of the shared memory section. After the respective new handle of the last intermediate process is closed, the shared memory section may be retained due to existence of the open second handle which references the shared memory section.

The target process may then use the name of the shared memory section to open a third handle to the shared memory section, close the second handle, and call a function to map the shared memory section to an address space of the target process. The target process may then access, or read, data stored in the shared memory by the source process.

In various embodiments, when marshaling a handle from a first process to a second process, a desired access to the shared memory section for the second process may be specified. For example, when marshaling the first handle from the source process to a first intermediate process of the one or more intermediate processes, the specified desired access may indicate no read access and no write access to the access control list and content of the shared memory section. As a result, the respective new handle of the first intermediate process may not permit the first intermediate process to access the content of the shared memory section. Similarly, when marshaling a respective new handle from one intermediate process to a next intermediate process, the specified desired access may indicate no read access and no write access to the access control list and the content of the shared memory section.

In some embodiments, a different desired access may be specified when marshaling a handle from a first process to a second process. For example, when marshaling the first handle from the source process to the first intermediate process of the one or more intermediate processes, the specified desired access may indicate read access. As a result, the intermediate process may have read access to content of the shared memory section provided that the access control list permits the first intermediate process to have read access to the shared memory section. In such embodiments, when marshaling a respective handle from an intermediate process to a next intermediate process, the specified desired access may indicate the read access to allow any other intermediate processes to have read access to the content of the shared memory section provided that the access control list permits such access. In other embodiments, the desired access may be specified differently when marshaling data from the source process through the one or more intermediate processes or from the last intermediate process to the target process. In some embodiments, access permissions of a new handle may be set depending upon characteristics of a process to which a handle is being marshaled. The characteristics may include, but not be limited to, content of a security descriptor of the process to which the handle is being marshaled.

Alternate embodiments may also be implemented as will be discussed in more detail below.

Exemplary Processing Device

Figure 1:
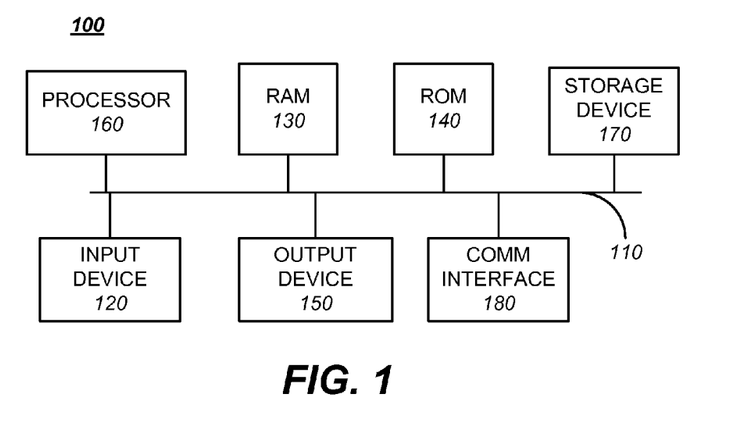
FIG. 1 is a functional block diagram of an exemplary computing device which may implement embodiments consistent with the subject matter of this disclosure.

FIG. 1 is a block diagram of an exemplary computing device 100, which may be used to implement embodiments consistent with the subject matter of this disclosure. Computing device 100 may be a server, a personal computer (PC), a laptop computer, a handheld computing device, or another type of computing device. Computing device 100 may include hardware, such as a processor 160, a bus 110, a memory, which may include a combination of random access memory (RAM) 130 and read only memory (ROM) 140, a storage device 170, an input device 120, an output device 150 and a communication interface 180.

Processor 160 may include one or more conventional processors that interpret and execute instructions. RAM 130, ROM 140, and/or another type of dynamic or static storage medium, respectively, may store information and instructions for execution by processor 160. RAM 130, or another type of dynamic storage medium, may store instructions as well as temporary variables or other intermediate information used during execution of instructions by processor 160. ROM 140, or another type of static storage medium, may store static information and instructions for processor 160. Some embodiments of computing device 100 may further include a hardware logic component, including, but not limited to, an application specific integrated circuit (ASIC) (not shown) and/or a field programmable gate array (FPGA) (not shown) that may be combined with instructions in memory 130, 140 to cause computing device 100 to perform a method.

Input device 120 may include a keyboard, a pointing device, or other device for providing input. Output device 150 may include a display, a printer, or other device for outputting information. Communication interface 180 may include a transceiver for sending and receiving information via a network (not shown).

Storage device 170 may include a machine-readable storage medium such as, for example, a magnetic disk, a writable optical disc, a flash RAM device, or other type of machine-readable storage media for storing data, instructions, or other information for more than a transitory time period. Non-limiting examples of storage device 170 may include Digital Video Disk (DVD), compact Disk (CD), or other types of storage devices using various types of machine-readable storage media for storing data and/or instructions for later use.

Computing device 100 may communicate with other devices via a communication medium, which may include, but not be limited to, a propagated signal on a carrier wave and may perform functions in response to processor 160 executing sequences of instructions contained in a machine-readable storage medium. Such instructions may be read into a machine-readable storage medium, including, but not limited to, RAM 130, from another machine-readable storage medium or from a separate device via communication interface (180).

Embodiments

Figure 2:
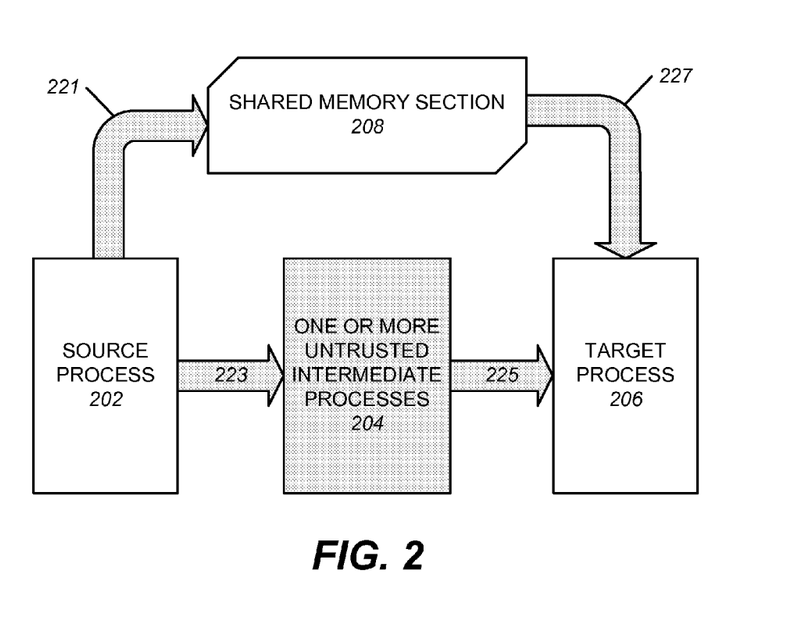
FIG. 2 is a functional block diagram that illustrates, at a high-level, operation of an embodiment consistent with the subject matter of this disclosure.

FIG. 2 is a functional block diagram illustrating, at a high level, an embodiment consistent with the subject matter of this disclosure. The embodiment includes a source process 202, one or more untrusted intermediate processes 204, a target process 206 and a shared memory section 208.

As illustrated by 221, source process 202 may create, name and populate shared memory section 208 with data. Shared memory section 208 may be secured by using an access control list which may prevent one or more untrusted intermediate processes 204 from accessing the data stored in shared memory section 208. As a result of creating shared memory section 208, a handle referencing shared memory section 208 may be returned to source process 202. As illustrated by 223, source process 202 may marshal the handle and the name of shared memory section 208 to one or more untrusted intermediate processes 204.

As a result of the handle being marshaled to a first intermediate process of one or more untrusted intermediate process 204, an open respective new second handle, referencing shared memory section 208, for the first intermediate process of untrusted intermediate process 204 may be created and provided to the first intermediate process. Each intermediate process, except for a last intermediate process, may marshal a respective new handle and the name of the shared memory section to a next intermediate process of one or more untrusted intermediate processes 204. Use of the respective new handle and the name of the section by an intermediate process of untrusted intermediate process 204 may not provide the intermediate process of untrusted intermediate process 204 with access to shared memory section 208. The last intermediate process of untrusted intermediate process 204 may marshal the respective new handle and the name of shared memory section 208 to target process 206, as illustrated by 225.

As a result of the respective new handle being marshaled to target process 206, an open second handle, which references shared memory section 208, may be created and provided to target process 206. The last intermediate process may then close its respective new handle. Target process 206 may then use the name of shared memory section 208 to open a third handle, with read access, to contents of shared memory section 208 and may access shared memory section 208 to read the data stored therein, as illustrated by 227. After opening the third handle, target process 206 may close the second handle.

Figure 3:
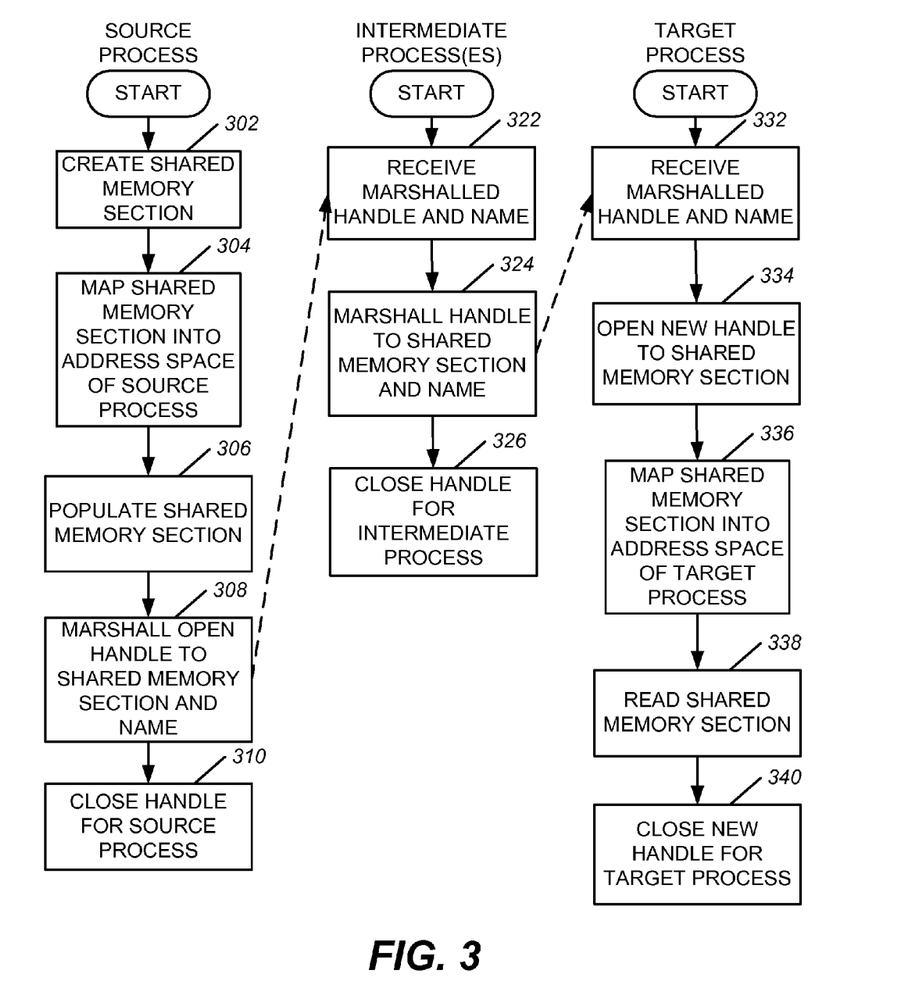
FIG. 3 includes flowcharts illustrating exemplary processing for a source process, an intermediate process and a target process in an exemplary embodiment consistent with the subject matter of this disclosure.

FIG. 3 includes flowcharts that illustrate exemplary operation of various embodiments consistent with the subject matter of this disclosure. The process may begin with source process 202 calling a function, such as, for example, an operating system function, to create shared memory section 208 and to return a first handle, which references shared memory section 208 for source process 202 (act 302). In Windows® operating systems, the function may be as follows:

CreateFileMapping ($1^{st}$ parameter, $2^{nd}$ parameter, $3^{rd}$ parameter, $4^{th}$ parameter, $5^{th}$ parameter),
where $1^{st}$ parameter may be an invalid handle value, $2^{nd}$ parameter may be a pointer to a security attributes structure that determines whether a returned handle can be inherited by child processes, $3^{rd}$ parameter specifies page protection of the shared memory section, $4^{th}$ parameter is a maximum size in bytes of shared memory section 208; and $5^{th}$ parameter is a name of shared memory section 208.

In some embodiments, the 2nd parameter may have a value of zero (null), thereby indicating that the returned handle cannot be inherited by child processes and the $3^{rd}$ parameter may indicate read-write page protection. In other embodiments, different parameters may be used. In embodiments using an operating system other than any of the Windows® operating systems, a differently-named function (or functions) having different parameters may be used to create shared memory section 208.

Next, source process 202 may call a function to map shared memory section 208 into an address space of source process 202 (act 304). In Windows® operating systems the function may be as follows:

MapViewOfFile ($1^{st}$ parameter, $2^{nd}$ parameter, $3^{rd}$ parameter, $4^{th}$ parameter),
where $1^{st}$ parameter may be a handle to shared memory section 208, $2^{nd}$ parameter may be a desired access to shared memory section 208, $3^{rd}$ parameter may be an offset into shared memory section 208 where a view begins, and $4^{th}$ parameter may be a size of a mapped area of shared memory section 208.

In various embodiments, the $2^{nd}$ parameter may indicate the desired access as read/write access and the $3^{rd}$ parameter may indicate an offset of 0. In other embodiments, different parameters may be used. In embodiments using an operating system other than any of the Windows® operating systems, a differently-named function (or functions) having different parameters may be used to map shared memory section 208 to the address space of source process 202.

Source process 202 may then populate shared memory section 208 with data (act 306). Source process 202 may then marshal reference information, including, but not limited to, the first handle and the name of shared memory section 208 to a first intermediate process of one or more intermediate untrusted processes 204 (act 308). In Windows® operating systems, marshaling the first handle may be accomplished by calling a function as follows:

DuplicateHandle ($1^{st}$ parameter, $2^{nd}$ parameter, $3^{rd}$ parameter, $4^{th}$ parameter, $5^{th}$ parameter, $6^{th}$ parameter, $7^{th}$ parameter), where $1^{st}$ parameter may be a handle for a current process, $2^{nd}$ parameter may be a handle to be duplicated, $3^{rd}$ parameter may be a handle to a process to which the handle to shared memory section 208 is being marshaled, $4^{th}$ parameter may be a pointer to a variable that receives a duplicate handle of the marshaled handle, $5^{th}$ parameter may specify a desired access for the duplicate handle, $6^{th}$ parameter may indicate whether the duplicate handle can be inherited by child processes of the target process, and $7^{th}$ parameter may affect whether a source handle is closed or whether the duplicate handle has a same access as a source handle. In various embodiments, the 5th parameter may specify read access, the 6th parameter may specify that the duplicate handle is not inheritable, and the $7^{th}$ parameter may be set to zero. In other embodiments different parameter values may be employed. In embodiments using an operating system other than any of the Windows® operating systems, a differently-named function (or functions) having different parameters may be used to marshal a handle to another process.

The name of shared memory section 280 may be marshaled using any method of inter-process communication including, but not limited to, well-known methods of inter-process communication.

After source process 202 marshals the first handle to the first intermediate process of one or more untrusted intermediate processes 204, resulting in the first intermediate process of one or more untrusted intermediate processes 204 receiving a respective new handle which references shared memory section 208. Source process 202 may then close the first handle (act 310). Because at least one handle referencing shared memory section 208 exists (i.e., the respective new handle), shared memory section 208 may be retained. Otherwise, shared memory section 208 may be released.

The first intermediate process of one or more untrusted intermediate processes 204 may receive the marshaled handle, as the respective new handle, and the marshaled section name (act 322). Untrusted intermediate process 204 may not be able to use the respective new handle and the section name to access shared memory section 208, but may marshal reference information, including, but not limited to, the respective new handle and the section name, to a next intermediate process of one or more untrusted intermediate processes 204, if any (not shown). If the current intermediate process is a last intermediate process of one or more untrusted intermediate processes, the last intermediate process may marshal reference information, including the respective new handle for the current intermediate process and the section name to target process 206 (act 324). The last intermediate process of one or more untrusted intermediate processes 204 may marshal the reference information to target process 206.

After the last intermediate process of one or more untrusted intermediate processes 204 marshals the respective new handle to target process 206, resulting in target process 206 receiving a second handle referencing shared memory section 208, the last intermediate process may close the respective new handle (act 326). Because at least one handle referencing shared memory section 208 exists (i.e., the second handle), shared memory section 208 may be retained. Otherwise, shared memory section 208 may be released.

Target process 206 may receive the marshaled handle, as the second handle, and the marshaled section name (act 332). Target process 206 may then use the name of shared memory section 208 to open a third handle with read access to shared memory section 208 and may close the second handle (act 334). In some embodiments, target process 206 may perform act 334 by calling CreateFileMapping to create and return the open third handle referencing shared memory section 208.

Target process 306 may then map shared memory section 208 into an address space of target process 206 (act 336). Target process 206 may perform act 336 in a similar manner as act 304 was performed. Target process 206 may then access and read shared memory section 208 (act 338).

After reading shared memory section 208, target process 206 may close the third handle (act 340). At this point, if no other handle that references shared memory section 208 exists, then the operating system may release shared memory section 208.

Alternative Embodiments

A number of alternative embodiments may be implemented. For example, when shared memory section 208 is created by source process 202, a different security descriptor (within the security attributes structure) may be specified for shared memory section 208. For example, the security descriptor may allow read access, but deny write access to content of shared memory section 208.

Figure 4:
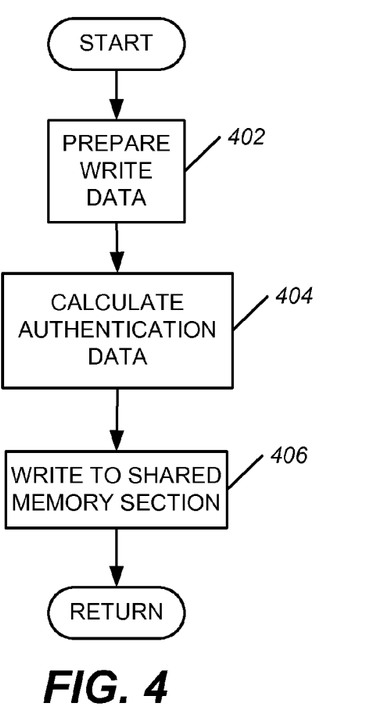
FIGS. 4 and 5 are flowcharts illustrating exemplary processing for a source process and a target process, respectively, in a first alternative embodiment consistent with the subject matter of this disclosure.

In a second alternative embodiment, source process 202 may store authentication data in shared memory section 208 and target process 206 may authenticate source process 202 based on the stored authentication data. FIG. 4 is a flowchart illustrating an exemplary process performed by source process 202 during act 306 (FIG. 3) in the second alternative embodiment. The process may begin with source process 202 performing any actions for preparing data for writing (act 402). Act 402 may include data generation or formatting in some embodiments. Source process 202 may then calculate or generate authentication data (act 404). In some embodiments, the authentication data may include a message digest calculated over contents of the data to be written to shared memory section 208. In other embodiments, other authentication methods may be employed to generate authentication data. Source process 202 may then write the data and the authentication data to shared memory section 208.

Figure 5:
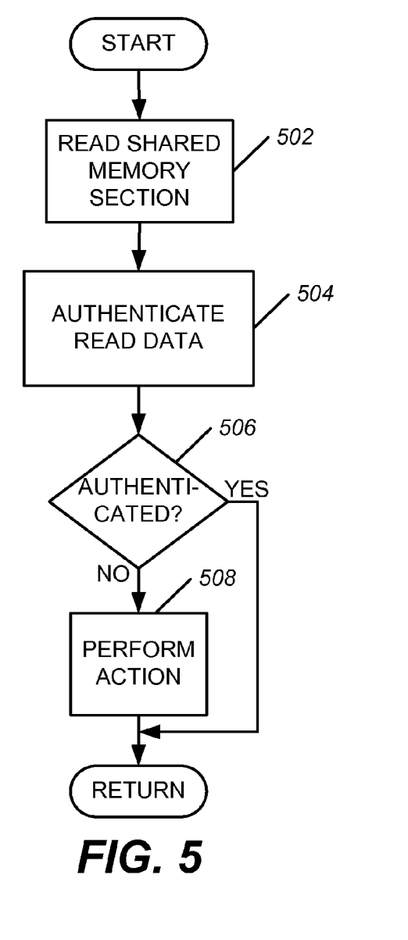

FIG. 5 is a flowchart illustrating an exemplary process performed by target process 206 during act 338 (FIG. 3) in the second alternative embodiment. The process may begin with target process 206 reading contents of shared memory section 208 (act 502). Target process 204 may then authenticate a sender (source process 202) of the data read from shared memory section 208 using the authentication data written to shared memory section 208 (act 504). Target process 204 may then determine whether authentication was successful (act 506). If authentication was successful, then the process is complete. Otherwise, target process 204 may perform an action, such as, for example, discarding the data read from shared memory section 208 and/or performing one or more other actions (act 508).

Figure 6:
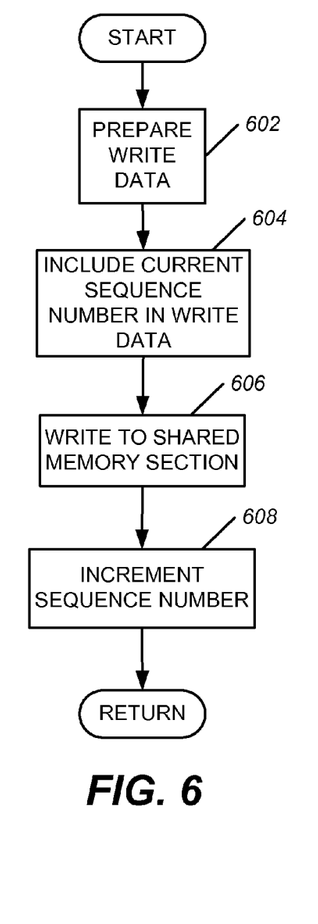
FIGS. 6 and 7 are flowcharts illustrating exemplary processing for a source process and a target process, respectively, in a second alternative embodiment consistent with the subject matter of this disclosure.

In a third alternative embodiment, source process 202 may store a sequence number in shared memory section 208 and target process 206 may determine whether data from source process 202 is missing based on an unexpected gap in sequence numbers. FIG. 6 is a flowchart illustrating an exemplary process performed by source process 202 during act 306 (FIG. 3) in the third alternative embodiment. The process may begin with source process 202 performing any actions for preparing data for writing (act 602). Act 602 may include data generation or formatting in some embodiments. Source process 202 may then include a current sequence number with data to be written to shared memory section 208 (act 604). Source process 202 may then write the data and the current sequence number to shared memory section 208 (act 606) and may increment the current sequence number (act 608).

Figure 7:
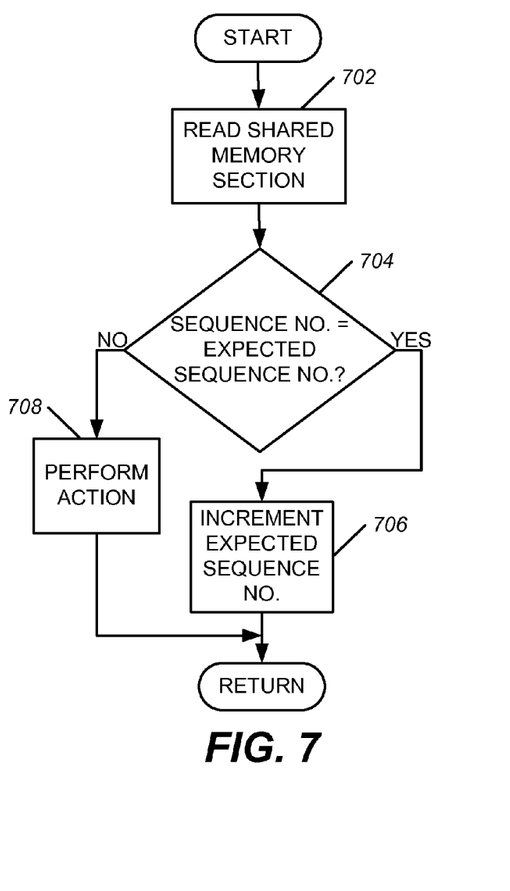

FIG. 7 is a flowchart illustrating an exemplary process performed by target process 206 during act 338 (FIG. 3) in the third alternative embodiment. The process may begin with target process 206 reading contents of shared memory section 208 (act 702). Target process 204 may then determine whether the sequence number read from shared memory section 208 is equal to an expected sequence number (act 704). If the read sequence number is equal to the expected sequence number, then target process 204 may increment the expected sequence number (act 706). Otherwise, target process 204 may perform an action, such as, for example, discarding the data read from shared memory section 208 and/or one or more other actions (act 708).

Figure 8:
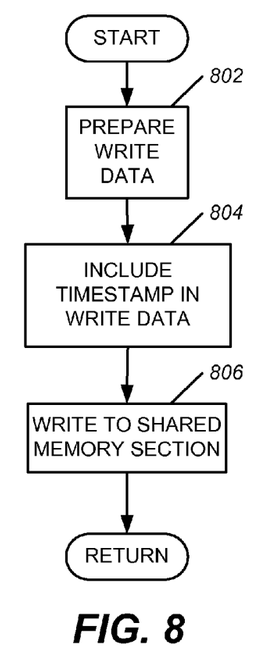
FIGS. 8 and 9 are flowcharts illustrating exemplary processing for a source process and a target process, respectively, in a third alternative embodiment consistent with the subject matter of this disclosure.

In a fourth alternative embodiment, source process 202 may store a timestamp into shared memory section 208 and target process 206 may detect an attack including, but not limited to a replay attack, based on the stored timestamp. FIG. 8 is a flowchart illustrating an exemplary process performed by source process 202 during act 306 (FIG. 3) in the fourth alternative embodiment. The process may begin with source process 202 performing any actions for preparing data for writing (act 802). Act 802 may include data generation or formatting in some embodiments. Source process 202 may include a current timestamp with the data to be written to shared memory section 208 (act 804). Source process 202 may then write the data and the timestamp to shared memory section 208 (act 806).

Figure 9:
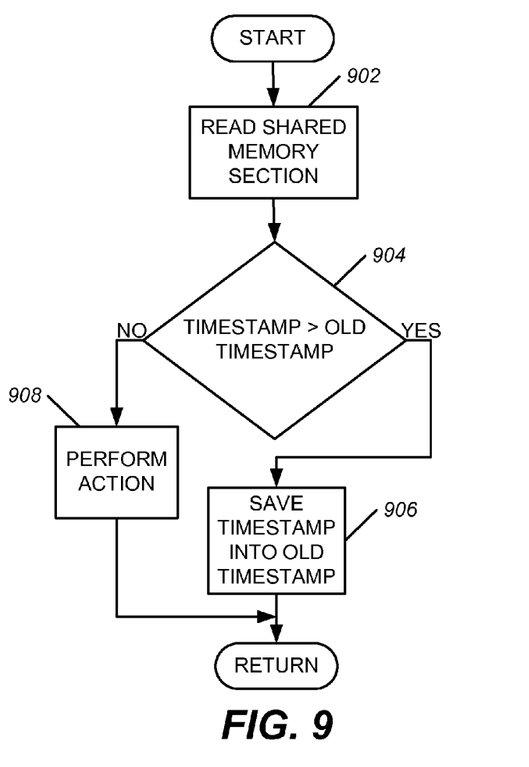

FIG. 9 is a flowchart illustrating an exemplary process performed by target process 206 during act 338 (FIG. 3) in the fourth alternative embodiment. The process may begin with target process 206 reading contents of shared memory section 208 (act 902). Target process 204 may then determine whether the timestamp read from shared memory section 208 indicates a later time than a last read timestamp from a last read contents of shared memory section 208 originated from source process 202 (act 904). If the timestamp read from shared memory section 208 indicates a later time than the last read timestamp, then the timestamp may be saved in order to be used for comparison with a timestamp included in another shared memory section 208 from source process 202 (act 906). Otherwise, target process 206 may perform an action, such as, for example, discarding the data read from shared memory section 208 and/or performing one or more other actions (act 908).

Figure 10:
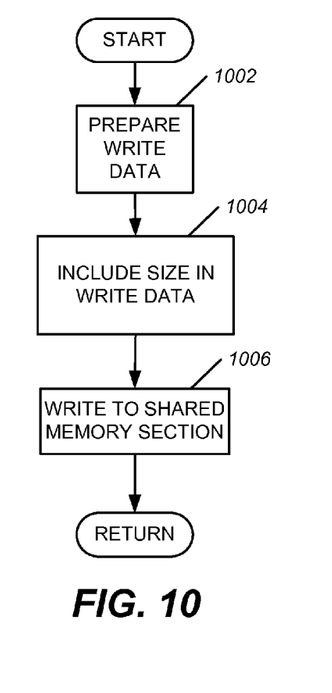
FIGS. 10 and 11 are flowcharts illustrating exemplary processing for a source process and a target process, respectively, in a fourth alternative embodiment consistent with the subject matter of this disclosure.

In a fifth alternative embodiment, source process 202 may store size information in shared memory section 208 to allow run-time sizing of shared memory section 208. FIG. 10 is a flowchart illustrating an exemplary process performed by source process 202 during act 306 (FIG. 3) in the fifth alternative embodiment. The process may begin with source process 202 performing any actions for preparing data for writing (act 1002). Act 1002 may include data generation or formatting in some embodiments. Source process 202 may include size data, indicating a size of shared memory section 208, with the data to be written (act 1004). Source process 202 may then write the data and the size data to shared memory section 208 (act 1006).

Figure 11:
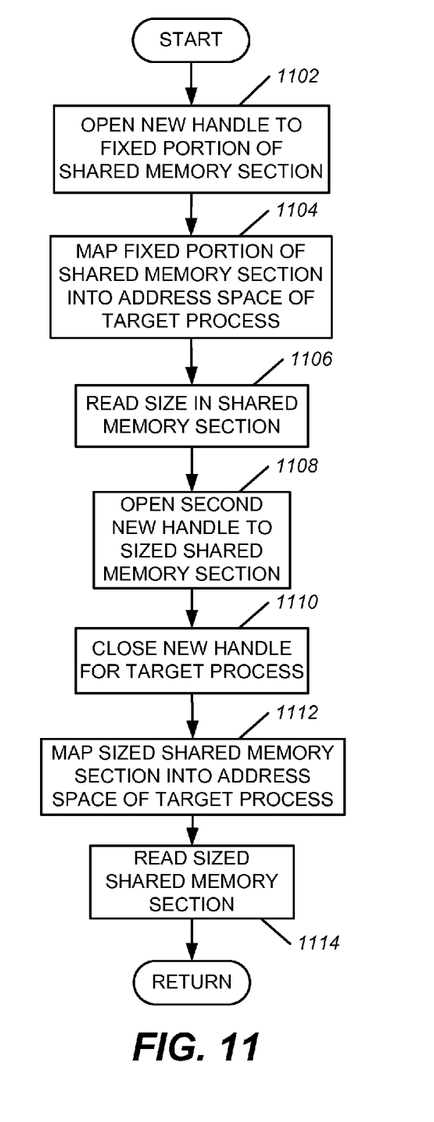

FIG. 11 is a flowchart illustrating an exemplary process performed by target process 206 during act 334 (FIG. 3) in the fifth alternative embodiment. The process may begin with target process 206 opening a first new handle to a fixed portion of shared memory section 208 based on the marshaled name of shared memory section 208 (act 1102). Target process 206 may then map the fixed portion of shared memory section 208 into the address space of target process 206 (act 1104). Target process 206 may then access and read the size data from shared memory section 208 (act 1106). Target process 206 may then open a second new handle to shared memory section 208, and may indicate a size of shared memory section 208 based on the read size data (act 1108). Target process 206 may then close the first new handle to shared memory section 208 (act 1110). The sized shared memory section 208 may then be mapped into the address space of target process 206 (act 1112). Target process 206 may then read complete contents of shared memory section 208 (act 1114). Acts 336-340 (FIG. 3) may then be performed. However, act 340 may be modified to close the second new handle because the first new handle was already closed during act 1110.

Miscellaneous

Although the above mentioned alternative embodiments are described as separate embodiments, various other alternative embodiments may include any or all of the features of the multiple previously described embodiments. For example, in one alternative embodiment source process 202 may write authentication data and size information to shared memory section 208 and target process 206 may read the size information in shared memory section 208, may open a handle to shared memory section 208 sized according to the size information and may perform authentication based on the authentication data.

CONCLUSION

Embodiments consistent with the subject matter of this disclosure efficiently and securely marshal data from a source process to a target process through one or more untrusted intermediate processes. The embodiments may efficiently marshal encrypted or unencrypted data without adversely affecting security of the data with respect to the one or more untrusted intermediate processes.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Accordingly, the appended claims and their legal equivalents define embodiments, rather than any specific examples given.

We claim as our invention:

1. A machine-implemented method for securely marshaling data between processes executing in at least one computing device, the machine-implemented method comprising:

creating a shared memory section by a source process executing in a computing device;

populating the shared memory section by the source process;

marshaling reference information regarding the populated shared memory section from the source process to a first intermediate process of at least one intermediate process executing in the computing device, the reference information not permitting access to the populated shared memory section by the at least one intermediate process;

repeating the marshaling, only when the at least one intermediate process includes at least two intermediate processes, of respective reference information from a respective intermediate process to a next respective intermediate process until the next intermediate process is a last intermediate process;

marshaling the reference information regarding the populated shared memory section from a last one of the at least one intermediate process to a target process executing in the computing device;

opening, by the target process, a new handle to the shared memory section by using at least some of the marshaled reference information; and reading, by the target process, the populated shared memory section.

2. The machine-implemented method of claim 1, wherein the populating the shared memory section by the source process further comprises:

populating the shared memory section with unencrypted information.

3. The machine-implemented method of claim 1, the reference information includes a handle to the shared memory section and a name of the shared memory section.

4. The machine-implemented method of claim 1, further comprising:

securing the populated shared memory section using an access control list which does not provide access to contents of the shared memory section by the at least one intermediate process and does provide access to contents of the shared memory section by the target process.

5. The machine-implemented method of claim 1, further comprising:

storing, by the source process, authentication data in the shared memory section; and authenticating, by the target process, the source process based on the authentication data stored in the shared memory section by the source process.

6. The machine-implemented method of claim 1, further comprising:

storing, by the source process, sequence data in the shared memory section; and checking, by the target process, the sequence data included in the shared memory section to detect an unexpected gap in sequence numbers.

7. The machine-implemented method of claim 1, further comprising:

storing timestamp data in the shared memory section by the source process.

8. The machine-implemented method of claim 1, further comprising:

storing size information in the shared memory section by the source process;

opening, by the target process, a fixed size portion of the shared memory section;

accessing, by the target process, the size information stored in the fixed size portion of the shared memory section; and reopening, by the target process, the shared memory section with a correct size as indicated by the size information.

9. A computing device comprising:

at least one processor; and a memory connected to the at least one processor, the memory having instructions recorded therein, such that when the at least one processor executes the instructions, operations are performed, the operations comprising:

creating a mapping to a shared memory section and opening a first handle for a source process, the first handle referencing the shared memory section, populating, by the source process, the shared memory section, creating and opening, by the source process, a new handle that references the shared memory section for a current intermediate process of at least one intermediate process, the second handle being based on the first handle to the shared memory process and having an access attribute associated therewith that limits or prevents access to content of the shared memory section by the at least one intermediate process, marshaling, by the source process, a reference to the shared memory section to the intermediate process, repeating while the current intermediate process is not a last intermediate process of the at least one intermediate process:

creating and opening, by the current intermediate process, a respective new handle that references the shared memory section for a next current intermediate process of the at least one intermediate process, and marshaling, by the current intermediate process, the reference to the shared memory section to the next current intermediate process of the at least one intermediate process, creating and opening, by the last intermediate process of the at least one intermediate process, a second handle that references the shared memory section for a target process, marshaling, by the last intermediate process, the reference to the shared memory section to the target process, opening, by the target process, a third handle to the shared memory section by using the marshaled reference to the shared memory section, and reading, by the target process, the shared memory section.

10. The computing device of claim 9, wherein the operations further comprise:

guaranteeing existence of the shared memory section as long as at least one handle that references the shared memory section is open.

11. The computing device of claim 9, wherein the operations further comprise:

securing the shared memory section by using an access control list.

12. The computing device of claim 9, wherein the operations further comprise:

storing, by the source process, authentication data in the shared memory section; and authenticating, by the target process, the source process based on the authentication data.

13. The computing device of claim 12, wherein the operations further comprise:
   discarding data populating the shared memory section when the target process fails to successfully authenticate the source process.

14. The computing device of claim 9, wherein the operations further comprise:
   storing timestamp data in the shared memory section by the source process; and
   detecting, by the target process, a replay attack based on the timestamp data stored in the shared memory section.

15. The computing device of claim 9, wherein the operations further comprise:
   storing sequence information in the shared memory section by the source process; and
   detecting, by the target process, an unexpected gap in numbering of the sequence information based on the stored sequence information.

16. A memory having instructions stored therein, such that when the instructions are executed by at least one processor of a computing device, the computing device performs a method comprising:
   opening, by a source process executing on the computing device, a first handle that references a shared memory section,
   populating, by the source process, the shared memory section,
   creating and opening, by the source process, a respective new handle that references the shared memory section for a current intermediate process of at least one intermediate process, the respective new handle having an access attribute associated therewith that restricts access to content of the shared memory section by the at least one intermediate process,
   marshaling, by the source process, a reference to the shared memory section to the current intermediate process,
   repeating while the current process is not a last intermediate process of the at least one intermediate process:
      creating and opening, by the current intermediate process, a respective new handle that references the shared memory section for a next current intermediate process of the at least one intermediate process, and
      marshaling, by the current intermediate process, the reference to the shared memory section to the next current intermediate process of the at least one intermediate process,
   creating and opening, by the last intermediate process, a second handle that references the shared memory section for a target process,
   marshaling, by the last intermediate process, the reference to the shared memory section to the target process,
   opening, by the target process, a third handle to the shared memory section by using the reference to the shared memory section, and
   reading, by the target process, the shared memory section.

17. The memory of claim 16, wherein the opening the third handle to the shared memory section comprises:
   opening, by the target process, a fixed size portion of the shared memory section;
   accessing, by the target process, size information stored in the fixed size portion of the shared memory section; and
   reopening, by the target process, the shared memory section with a correct size as indicated by the size information.

18. The memory of claim 16, wherein the method further comprises:
   securing the shared memory section by using an access control list which does not allow access to the content of the shared memory section by the intermediate process and does allow the target process to access the content of the shared memory section.

19. The memory of claim 18, wherein the method further comprises:
   storing, by the source process, authentication data in the shared memory section; and
   authenticating, by the target process, the source process based on the authentication data stored in the shared memory section by the source process.

20. The memory of claim 16, wherein the method further comprises:
   storing, by the source process into the shared memory section, sequence data, timestamp data, or both of the sequence data and the timestamp data.

* * * * *